(12) United States Patent
Kato et al.

(10) Patent No.: US 7,103,448 B2
(45) Date of Patent: Sep. 5, 2006

(54) ROBOT SYSTEM

(75) Inventors: Tetsuaki Kato, Hadano (JP); Yukinobu Tsuchida, Yamanashi (JP); Makoto Someya, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 255 days.

(21) Appl. No.: 10/695,664

(22) Filed: Oct. 29, 2003

(65) Prior Publication Data

US 2004/0128029 A1 Jul. 1, 2004

(30) Foreign Application Priority Data

Oct. 30, 2002 (JP) ............................. 2002-315971

(51) Int. Cl.
*G06F 19/00* (2006.01)
(52) U.S. Cl. ...................... 700/245; 318/601; 318/602; 318/661
(58) Field of Classification Search ................ 700/245; 318/601, 602, 661
See application file for complete search history.

(56) References Cited

U.S. PATENT DOCUMENTS

| 4,632,631 | A | * | 12/1986 | Dunlap ........................ 901/41 |
| 5,602,967 | A | * | 2/1997 | Pryor ........................ 700/259 |
| 5,636,425 | A | * | 6/1997 | Best ........................ 29/407.04 |
| 5,640,100 | A | * | 6/1997 | Yamagata et al. ........... 324/754 |
| 6,301,763 | B1 | * | 10/2001 | Pryor ...................... 29/407.04 |
| 6,322,418 | B1 | * | 11/2001 | Hippely et al. .............. 446/487 |

FOREIGN PATENT DOCUMENTS

| JP | 6012714 A | * | 7/1985 |
| JP | 360209814 A | * | 10/1985 |
| JP | 361278908 A | * | 12/1986 |
| JP | 4365574 | | 12/1992 |
| JP | 5-4181 | | 1/1993 |

OTHER PUBLICATIONS

Sandelin et al., IRIS-Moduloar vision guided servo tooling system for robots, 2004, Inaternet, p. 1-8.*
Notification of Grounds for Rejection dated Sep. 27, 2004.

* cited by examiner

*Primary Examiner*—Thomas G. Black
*Assistant Examiner*—McDieunel Marc
(74) *Attorney, Agent, or Firm*—Staas & Halsey LLP

(57) ABSTRACT

A robot system capable of performing automatic updating of data inherent to a robot mechanism section or a mechanical unit thereof when changing the robot mechanism section or the mechanical unit. After changing the robot mechanism section or the mechanical unit, data of identifiers are read by a robot control section from nonvolatile memories associated with encoders in the robot mechanism section or the mechanical unit automatically upon turning-on of a power supply on or a manual operation. If it is determined that a kind of the robot is changed, the data indicating the kind of robot is rewritten in the robot control section. If it is required to change an algorithm for forward/inverse transformation for calculation of a robot locus, the algorithm is changed. If a kind of the robot is not changed, it is determined whether individuality of the whole robot mechanism section or the mechanical unit is changed or not. If there is a change in the individuality, the data inherent to the individuality is read from the nonvolatile memories to update the corresponding data in the robot control section.

18 Claims, 5 Drawing Sheets

| ADDRESS | CONTENTS OF DATA | EXAMPLE |
|---|---|---|
| 0 | INDIVIDUAL NUMBER (FIRST SIX PLACES) + KIND OF MECHANICAL UNIT (LAST TWO PLACES) | 00005301 |
| 1 | KIND OF ROBOT | 03 |
| 2 | d (AXIAL LENGTH [mm]) | 498 |

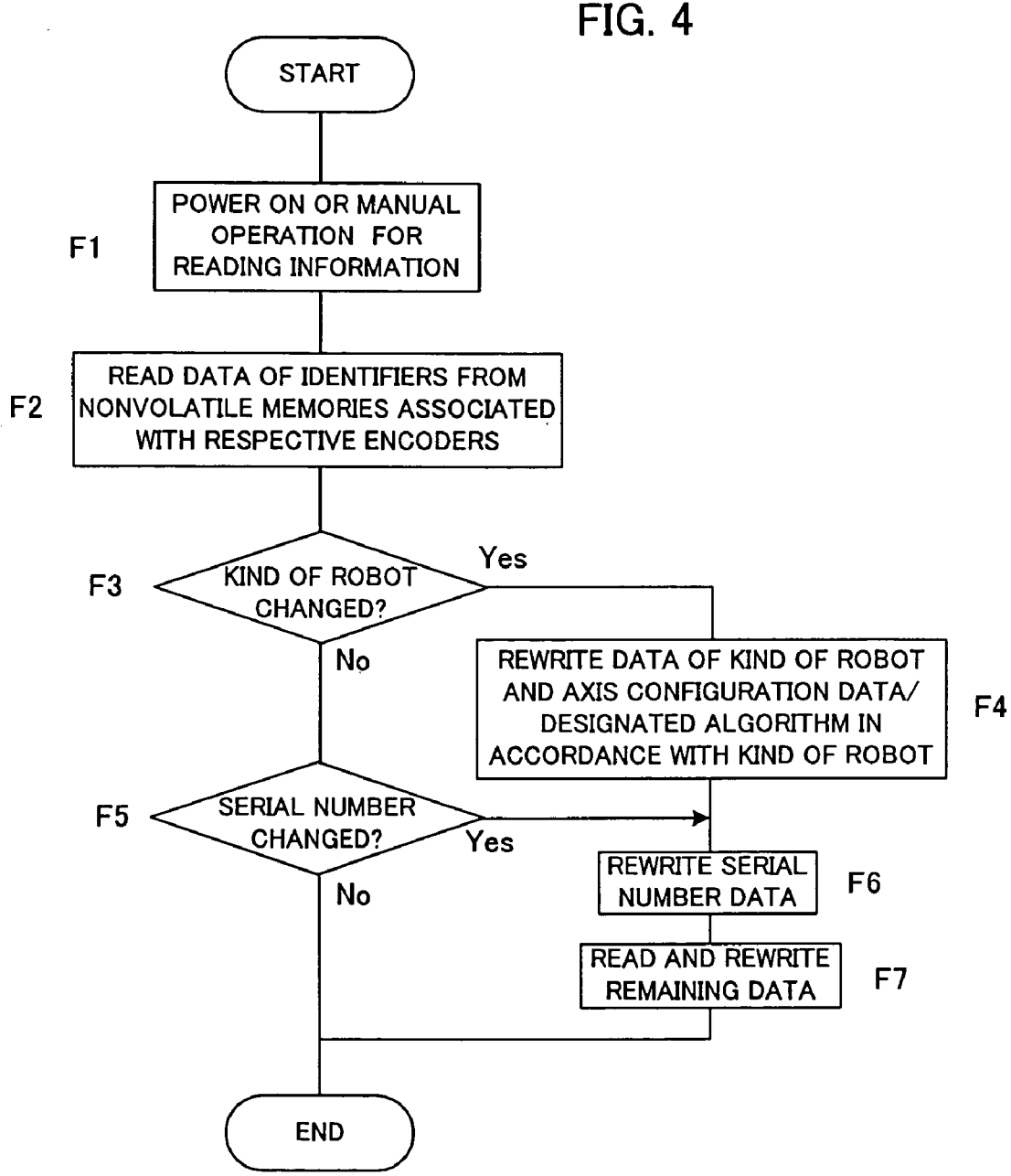

ROBOT SYSTEM

BACKGROUND OF THE INVENTION

1. Field of the Invention

The present invention relates to a robot system for industrial use, and more particularly to a robot system comprising a mechanism section and a control section connected with each other, in which the whole or a part of the mechanism section is changeable.

2. Description of Related Art

In general, a robot system comprises a mechanism section (a robot mechanism including a base, arms and a wrist) and a control section (a robot controller) connected to the mechanism section, and the whole or a part of the mechanism section is required to be changed with another one because of failure, maintenance and other reasons. There is known to prepare a part of the mechanism section as a detachable mechanical unit.

In practice, after the whole mechanism section or a mechanical unit thereof is changed, if the robot is operated using data of an operation program used before the change, there is a case where a locus of an operational end of the robot is changed to fail in a proper operation of the robot. This is caused by a difference in individual dimensions and/or angular configurations of respective components of the mechanism section or the mechanical units even if a kind of the mechanical section (i.e. a kind of the robot) or a kind of mechanical unit (i.e. a design of the mechanical unit) is the same as that before the change.

Therefore, it has been necessary to perform calibration on the dimensions and/or the angular configuration of the mechanism section, or modification of taught data of the operation program in order to retain the same locus after the change of the whole mechanism section or the mechanical unit, requiring laborious works to lower efficiency of the robot system.

SUMMARY OF THE INVENTION

The present invention provides a robot system capable of performing a proper operation without performing laborious calibration on dimensions or angular configurations of respective components of a robot mechanism section or a mechanical unit constituting the robot mechanical section, or re-setting of parameters for controlling a locus of the robot when the whole mechanism section or the mechanical unit is changed with another one.

According to one aspect of the present invention, a robot system comprises: a changeable robot mechanism section; a robot control section for controlling respective axes of the robot mechanism section; and a memory provided at the robot mechanism section, and storing information concerning parameters inherent to individuality of the robot mechanism section to be used in calculation of a locus control of the robot mechanism section by the robot control section, the memory being connected with the robot control section so that the stored information is read by the robot control section.

According to another aspect of the present invention, a robot system comprises: a robot mechanism section including a changeable mechanical unit; a robot control section for controlling respective axes of the robot mechanism section; and a memory provided at the mechanical unit and storing information concerning parameters inherent to individuality of the changeable mechanical unit to be used in calculation of a locus control of the robot mechanism section by the robot control section, the memory being connected with the robot control section so that the stored information is read by the robot control section.

It is preferable that the stored information includes information designating an algorithm to be used in calculation of the robot locus by the control section. The stored information may include data of a measured or estimated value of a length of a predetermined part of the mechanism section. Alternatively, the stored information may include data of an error between a measured or estimated value and a design value of a length of a predetermined part of the mechanism section.

The memory may comprise a nonvolatile memory associated with one of encoders for detecting rotational positions of motors for driving the respective axes, and the robot control section may read information stored in the nonvolatile memory using a communication line between the one of the encoders and the robot control section.

The memory may store identification information for identifying individuality of the robot mechanism section or the mechanical unit. In this case, the robot control section reads the identification information from the memory and if the read identification information is different from corresponding identification information stored in the robot control section, the read information including the identification information is substituted for corresponding information stored in the robot control section.

With this feature, a difference in individualities of the robot control sections or the mechanical units before and after the change (including a reuse of the same one) thereof is automatically determined, and only if there is a difference in the individualities, updating of the data is performed to eliminate unnecessary rewriting of the data when there is no difference in the individualities of the robot control section or the mechanical units.

The stored information may be automatically read by the robot control section when a power supply to the robot control section is turned on, or in response to a manual operation on the robot control section by an operator.

BRIEF DESCRIPTION OF THE DRAWINGS

FIG. 4 is a flowchart of processing for updating the parameters to be performed after a change of the whole mechanism section or one or more mechanical units of the mechanism section;

DETAILED DESCRIPTION

Figure 1:
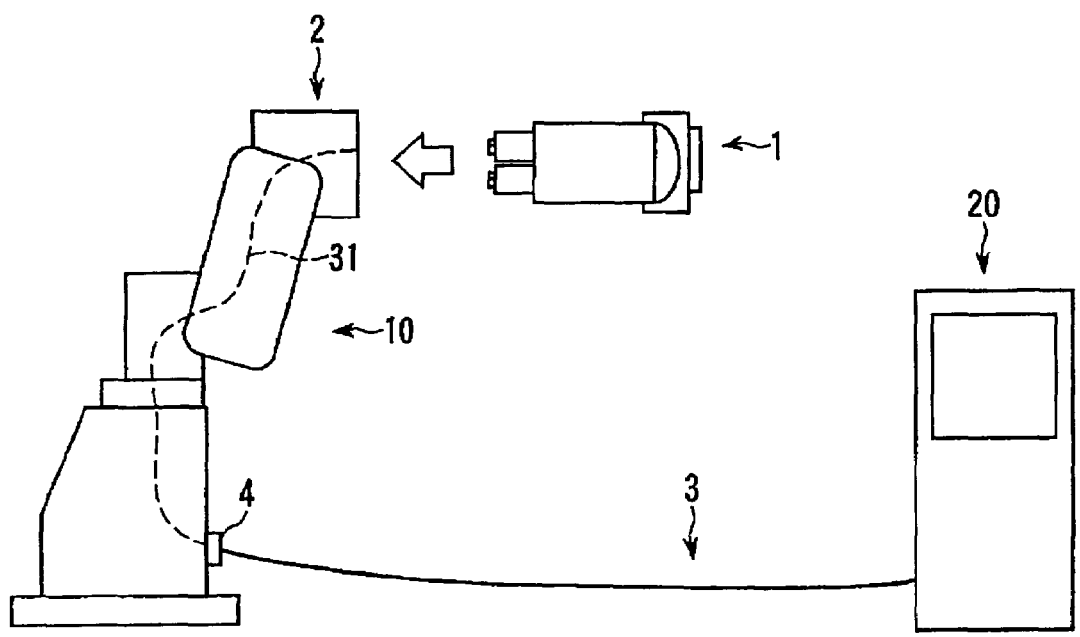
FIG. 1 is a schematic diagram of a robot system comprising a mechanism section with a wrist unit and a main unit, and a control section connected to the mechanism section according to an embodiment of the present invention.

A robot system according to an embodiment of the present invention is shown in FIG. 1. In FIG. 1, a robot system comprises a mechanical section (i.e. a robot mechanism) 10 and a control section (i.e. a robot controller) 20 which are connected with each other by a cable 3.

The robot control section 20 comprises a CPU, a memory, servo controllers, an interface for keyboard, a communication interface for communication with external devices such as encoders provided at motors for driving respective axes of the robot mechanism section 10 and nonvolatile memories associated with the encoders, as described later. The memory of the robot control section 20 stores a software for generally controlling the system, data for operation programs including taught position data, parameters concerning a locus calculation of the robot such as D-H (Denavit-Hartenberg) parameters, data of an algorithm of forward/inverse transformation and software for executing the algorithm.

In addition, the memory stores a software for reading information stored in nonvolatile memories associated with encoders in the robot mechanism section 10 through a communication line for the encoders.

The cable 3 includes a predetermined number of signal lines and power lines and is connected with an inner cable 31 through a connector 4, to be connected to the respective motors and encoders, etc. branching at appropriate positions. Communication lines for reading the information stored in the nonvolatile memories associated with the encoders are included in the cable 3 and the inner cable 31.

The robot mechanism section 10 of the robot system includes changeable mechanical units in this embodiment. The changeable mechanical unit is detachable from the robot mechanism section 10, and the detached changeable mechanical unit may be reused by attaching it to the robot mechanism 10 again.

The robot mechanism 10 may not include a changeable mechanical unit so that the whole robot mechanism is changeable with another one of the same type or a different type. Further, the whole robot mechanism section including changeable mechanical units may be changed according to the present invention.

In this embodiment, the robot mechanism section 10 comprises a wrist unit 1 and a main unit 2, as shown in FIG. 1. The wrist unit 1 is detachable from the main unit 2 and the detached wrist unit 1 may be attached again. Alternatively, the wrist unit 1 may be exchanged with another one of the same kind (i.e. the same design) or another one of a different kind (different in design value of an axial length or in the number of motors provided therein).

Figures 2, 3:
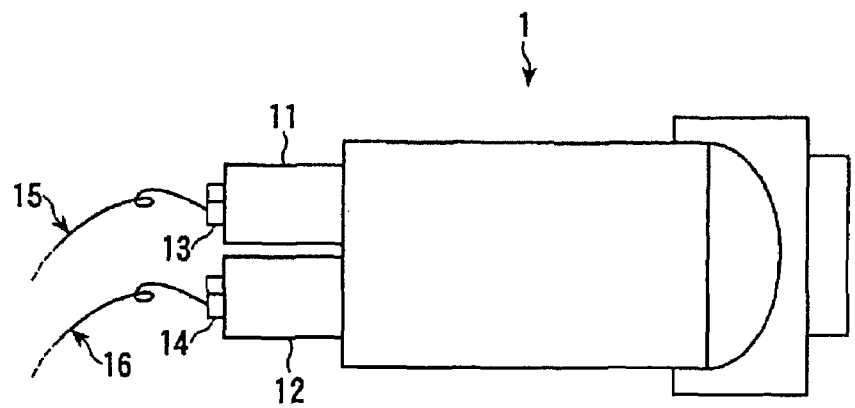
FIG. 2 is a schematic diagram of the wrist unit in which nonvolatile memories are provided to be respectively associated with encoders built in servomotors.
FIG. 3 is a diagram showing a table for storing specific information.

As shown in FIG. 2, the wrist unit 1 is provided with two servomotors 11 and 12, each having a pulse encoder built therein, for driving a fourth axis and a fifth axis of the robot mechanism section 10, and nonvolatile memories 13 and 14 respectively associated with the pulse encoders. Communication lines 15 and 16 from the encoders 13 and 14 are connected with the robot control section 20 through the inner cable 31 and the cable 3. The nonvolatile memories 13 and 14 stores information concerning parameters inherent to individuality of the wrist unit 1 to be used in calculation of a locus control of the robot mechanism section 10 by the robot control section 20.

In the main unit 2, necessary information is stored in at least one of nonvolatile memories provided to be associated with encoders of servomotors for driving first to third axes of the robot mechanism 10. In this embodiment, data of D-H parameters regarding the first to third axes are respectively stored in the nonvolatile memories associated with the encoders for the first to third axes.

An example of information stored in the nonvolatile memories 13, 14 provided at the wrist unit 1 and the nonvolatile memories provided at the main unit 2 is shown in FIG. 3. The stored information is classified into identifiers and parameter data. In this example, the following two identifiers are used.

Identifier #1: a code indicating an individual number and a kind of mechanical unit, and Identifier #2: a code indicating a king of the robot to be constituted by the mechanical unit.

The individual number is used for identifying the individual mechanical unit and a serial number assigned in manufacturing of the mechanical unit is used, for example. For the two kinds of mechanical units of the wrist unit 1 and the main unit 2, a kind code "01" is assigned for the wrist unit 1 and a kind code "02" is assigned for the main unit 2 in this embodiment.

In this embodiment, a kind of a wrist unit comprising the fourth and fifth axes (constituting a five-axes robot) and a kind of a wrist unit comprising the fourth axis only (constituting a four-axes robot) are used in accordance with the kind of the robot. The wrist unit 1 shown in FIG. 2 is of the type having the fourth and fifth axes (constituting a five-axes robot).

In this embodiment, the main unit 2 comprises the first to third axes for any kinds of the robot. The codes "01" to "04" are assigned to the four kind of robots as follows;

Code "01": a five-axis robot of a standard type
Code "02": a four-axis robot of a standard type
Code "03": a five-axis robot of a long type
Code "04": a four-axis robot of a long type As the parameter data, various kinds of data including the D-H parameters may be stored. In this example, an axial length "d" of the mechanical unit is stored as the parameter data. As the data of the axial length "d", a precise value of the axial length inherent to an individual mechanical unit (a measured value or an estimated value), or an error (with a positive or negative sign) between the measured or estimated value of the individual mechanical unit and a design value of the mechanical unit of the same kind are stored in the nonvolatile memories 13 and 14.

As shown in FIG. 3, the above-described information is stored in advance after the manufacturing of the mechanical unit at a predetermined address in the nonvolatile memories 13 and 14. In this example, the identifier #1 is stored in an address "0", the identifier #2 is stored in an address "1", and the measured or estimated value of the axial length d is stored in an address "2". The values in the right columns are examples of respective actual values.

The data in first six places of the code "00005301" stored at the address "0" specify the serial number and the data in the last two places specify a kind of the mechanical unit. The data "03" stored in the address "1" specify a kind of the robot mechanism section (a five-axis robot of long-arm type in this example). The data "498" stored at the address "2" specify a measured value or an estimated value of the axial length d of the mechanical unit (the wrist unit 1 in this example) by unit of mm. Data "−2" specifying an error between the measured or estimated value and the design value of the axial length d (500 mm in this example) may be stored in the address "2" instead of the measured or estimated value.

Relation between the kind of the robot and algorithm of the locus control of the robot will be described.

It is necessary to change algorithms of forward/inverse transformation to be used in calculation of the robot locus in response to change of the kind of robot mechanism. For example, four algorithms for "a forward/inverse transformations set No. 1", "a forward/inverse transformations set No. 2", "a forward/inverse transformation set No. 3" and "a forward/inverse transformation set No. 4" are prepared to be used for the four kinds of robot in the robot control section 20, and the code indicating the kind of robot is read and the robot control section 20 may designate or change the algorithm for performing forward transformation and inverse transformation in accordance with the read code.

The information stored in the nonvolatile memory associated with the encoder in the main unit 2 includes a serial number for identifying individuality and data necessary to be changed when the main unit 2 is changed with another one (of the same type having the same design or of a different type having a different design), e.g. D-H parameters regarding the respective axes of the first to third axes.

The processing for reading the specific information with the above premise is shown in the flowchart of FIG. 4. The summary of respective steps of the processing are as follows;

Step F1: After completion of change of the mechanical unit (including reuse of the same mechanical unit) or the whole robot mechanism section and connection of the cable 3 with the robot control section 20, a power supply is turned ON. If a manual operation for reading the specific information stored in the nonvolatile memories is required, an operator carries out the manual operation through the manual data input device.

Step F2: The data of the identifiers are read from the nonvolatile memories associated with respective encoders. In this embodiment, the data of the identifiers #1 and #2 and the data of identifiers stored in the nonvolatile memories associated with the encoders in the main unit 2 are read.

Step F3: The read data of the identifier #2 is compared with the corresponding data stored in the memory of the robot control section 20, and it is determined whether a kind of the robot is changed or not. If a kind of the robot is changed, the procedure proceeds to Step F4, and if not, the procedure proceeds to Step F5.

Step F4: The data indicating a kind of the robot is rewritten in the memory of the robot control section 20. For example, the data "04" stored in the memory of the robot control section are rewritten to "03" in this example. Also, if it is necessary to change the data regarding the axis configuration, the data is rewritten (the axis structure is determined by the determination of the kind of the robot). If it is necessary to change the algorithm of the forward/inverse transformation, the algorithm of the forward/inverse transformation is rewritten. In this example, one of the algorithms for forward/inverse transformations No. 1 to No. 4 is designated in accordance with the kind of robot. After completion of processing of Step F4, the procedure proceeds to Step F6.

Step F5: The data of the identifier #1 read from the nonvolatile memory associated with the endoders of the respective mechanical units are compared with the corresponding data stored in the memory of the robot control section 20, and it is determined whether any mechanical unit (the wrist unit and the main unit in this embodiment) is changed or not. If there is any change of the mechanical units, the procedure proceeds to Step F6, and if not, the procedure is terminated.

Step F6: The data of the serial number stored in the robot control section 20 is rewritten. For example, the stored data "00004501" is rewritten to "00005301" in this example where the wrist unit is change to another one of the same type. After completion of processing of Step F6, the procedure proceeds to Step F7.

Step F7: The remaining data are read from the nonvolatile memories associated with the respective encoders. In this example, the data of the axial length of the wrist unit 1 is read from the nonvolatile memory associated with the encoders of the wrist unit 1. Also, the D-H parameter regarding the fourth and fifth axes are read. The D-H parameters regarding the first to third axes are read from the nonvolatile memory associated with the encoders in the main unit 2. These parameters are used for computing of locus of the robot. After completion of the processing of Step F7, the procedure is terminated.

Figure 5A:
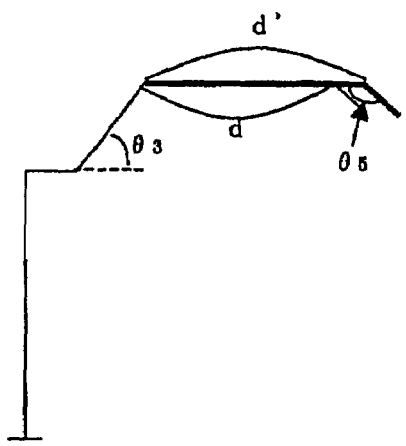
FIG. 5a is a schematic diagram showing a displacement of position of an operational end of the wrist unit after the change thereof without updating an axial length.
Figure 5B:
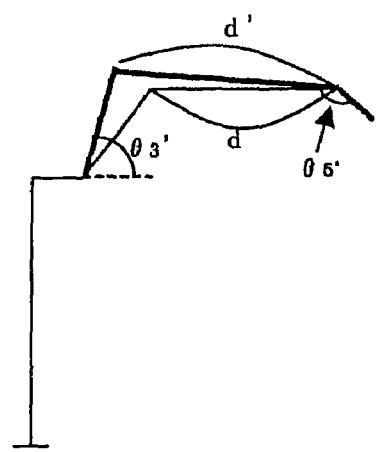
FIG. 5b is a schematic diagram of position of the operational end of the robot compensating the displacement using updated axial length.

Thus, if there is a change of the mechanical unit or the change of the whole robot mechanism section, proper control of the robot locus can be carried out without performing calibration of the axial lengths. For instance, as shown in FIGS. 5a and 5b, there is a difference in the axial length of the wrist unit 2 before and after the change thereof (d: dimension of the wrist unit before the change and d': dimension of the wrist unit after the change), a distal end of the wrist is displaced with the angles of the respective axes maintained. Therefore, the locus of the distal end of the robot is changed if the parameters regarding the axial lengths are used unchanged. The angles of the respective axes are calculated using the data of the mechanical units (the axial length of the wrist unit) to correct the displacement of the operational end of the wrist unit as shown in FIG. 5b, to realize the same locus before and after the change of the mechanical units.

Figure 6:
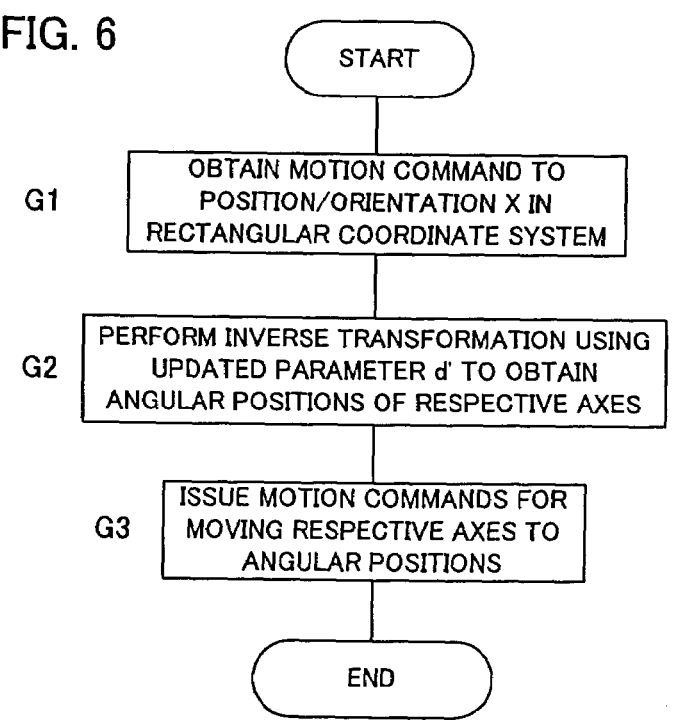
FIG. 6 is a flowchart of processing for operating the robot after updating the data of the axial length of the wrist unit.

The processing for the locus control of the robot is shown in the flowchart of FIG. 6. First, a motion command to move to a position/orientation x in a rectangular three-dimensional coordinate system is given by a playback operation of the operation program in the robot control section 20 (Step G1). Based on the motion command, the inverse transformation is performed using the updated axial length d' of the changed wrist unit 1 to obtain angular positions $\theta_1$–$\theta_5$ of the respective axes (Step G2). If the designation of the algorithm for forward/inverse transformation is changed, the updated algorithm is used.

Then, motion commands to angular positions $\theta_1$–$\theta_5$ of the respective axes are issued to servo controllers in the robot control section 20 for driving the respective axes of the robot mechanism section 10 to move the distal operational end of the robot to the commanded position/orientation x. If there is any change in the other parameters, the calculation of the locus control is performed using the updated parameters to retain the proper locus control without any influence on the change of the mechanical units or the whole robot mechanism section.

In the foregoing embodiment, the robot mechanism section includes a mechanical unit. However, in the case where the robot mechanism section is prepared as a unit to require the whole change of the robot mechanism section, an identification number such as a serial number and a code indicating a kind of the robot mechanism section may be stored in the nonvolatile memory associated with one of the encoders in the robot mechanism section to be used as the identifier #1. In this case, the whole robot mechanism section may be considered as one mechanical unit.

Figure 7:
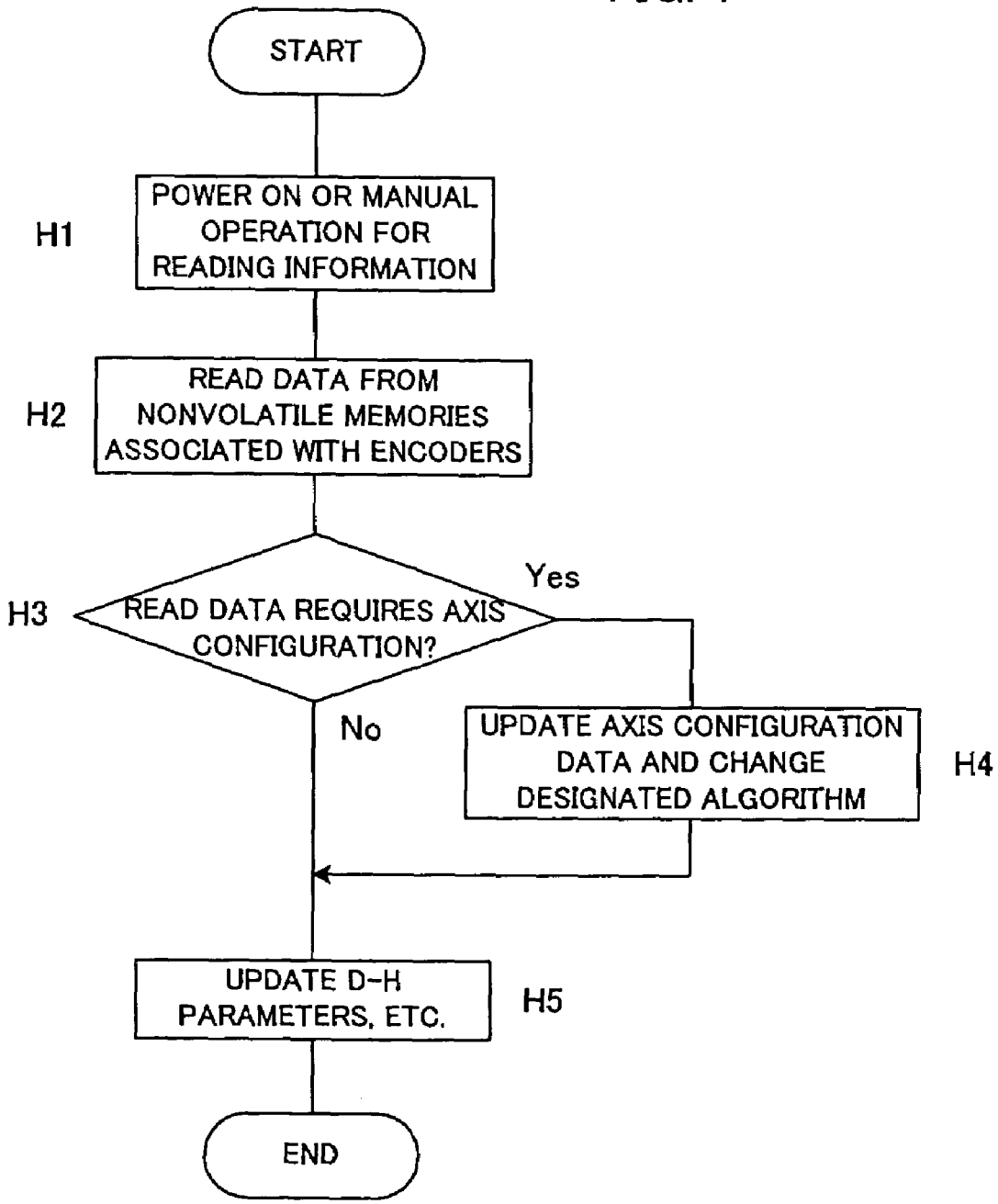
FIG. 7 is a flowchart of another processing for updating the parameters to be performed after a change of the robot mechanism section or the mechanical units.

In either of the case where the robot mechanism section has at least one mechanical unit and the case where the robot mechanism section is constituted as a unit and can not be exchanged unless as a whole, the equivalent effect can be obtained without using the serial number of the mechanical unit or the robot mechanism section. The processing for obtaining the information without using the serial number is shown in the flowchart of FIG. 7. The summary of respective steps are as follows;

Step H1: After completion of change of the mechanical unit (including reuse of the same mechanical unit) or change of the whole robot mechanism section and connection of the cable 3 with the robot controller 20, a power supply is turned ON. If a manual operation for reading the specific information stored in the nonvolatile memories is required, an operator carries out the manual operation through manual data input device.

Step H2: The data stored in the nonvolatile memories associated with the respective encoders are read. The nonvolatile memories store parameters, e.g. D-H parameters, regarding the encoders associated with respective axes with labels identifying the data to be associated with the respective axes. For instance, a label code "1" is affixed in a first place of the parameter regarding the first axis, a label code "2" is affixed as a first code of the parameter regarding the second axis, and in the same manner a label code "N" is affixed to a first code of the parameter regarding the N-th axis. The data for identifying individuals of the mechanical unit or the robot mechanism section are not stored in the nonvolatile memory. The data indicating the kind of the robot are stored in one of the nonvolatile memories associated with the encoders in the robot mechanism section 10.

Step H3: The read data regarding the respective axes are compared with the corresponding data stored in the memory of the robot control section 20, and it is determined whether or not it is necessary to change the axes configuration of the robot. For instance, in the case where data regarding the first axis to the fifth axis are stored in the robot control section 20 before the change of the mechanical unit or the whole robot mechanism section, and the data read from the nonvolatile memories in the robot mechanism section are data regarding the first to sixth axes, it is determined that the number of axes in the wrist unit or a wrist of the robot mechanism section changes from two to three.

If it is determined that the read data requires change of axis configuration of the robot, the procedure proceeds to Step H4, and if not, the procedure proceeds to Step H5.

Step H4: The data regarding the axes configuration of the robot stored in the robot control section 20 are rewritten. The data designating the algorithm for forward/inverse transformation are rewritten based on the data on the kind of the robot.

Step H5: The data for the respective axes (the D-H parameters) in the memory of the robot control section 20 are rewritten to the corresponding read data. Although there is not any change in the axis configuration of the robot, if the kind of robot is changed, the algorithm designation data is rewritten. Further, if the kind of robot is changed, the other data stored in the robot control section for the kind of robot are automatically updated. The processing of Step H5 is completed, the procedure is terminated.

With the above procedure also, in the case where there is a change of the mechanical unit or a change of the whole robot mechanism section, a proper control of the robot locus can be carried out without performing calibrations on the axial lengths and/or the angular configuration of the robot mechanism section. For instance, in the case where there is a change in the D-H parameter of the third axes from a value "a" before the change to a value "a'" after the change, for example, the corresponding data stored in the memory of the robot control section are rewritten from the value "a" to the value "a'" and the inverse transformation is carried out using the rewritten value "a'" in the same manner as shown in FIG. 6, to realize the proper robot locus.

According to the present invention, in the case where the whole robot mechanism section or a part of the robot mechanism section is changed, the data to be used in the locus control is automatically updated in the robot control section to realize the proper locus control without calibration of the axial lengths or the angular configuration using the same operation program for the robot.

What is claimed is:

1. A robot system comprising:
a changeable robot mechanism section;
a robot control section for controlling respective axes of said robot mechanism section; and
a memory provided at said robot mechanism section, and storing information concerning parameters inherent to individuality of said robot mechanism section to be used in calculation for a locus control of the robot mechanism section by said robot control section, said memory being connected with said robot control section so that the stored information is read by said robot control section.

2. A robot system according to claim 1, wherein said stored information further includes information designating an algorithm to be used in calculation for the locus control by said control section.

3. A robot system according to claim 1, wherein said stored information includes data of a measured or estimated value of a length of a predetermined part of said mechanism section.

4. A robot system according to claim 1, wherein said stored information includes data of an error between a measured or estimated value and a design value of a length of a predetermined part of said mechanism section.

5. A robot system according to claim 1, wherein said robot mechanism section has motors for driving the respective axes and one or more encoders for detecting rotational positions of the motors, said memory comprises a nonvolatile memory associated with one of said encoders, and said robot control section reads information stored in the nonvolatile memory using a communication line between said one of the encoders and said robot control section.

6. A robot system according to claim 1, wherein said memory stores identification information for identifying individuality of the robot mechanism section, and said robot control section reads the identification information from said memory and if the read identification information is different from corresponding identification information stored in the robot control section, the read information including the identification information is substituted for the corresponding information stored in the robot control section.

7. A robot system according to claim 1, wherein said stored information is automatically read by the robot control section when a power supply to said robot control section is turned on.

8. A robot system according to claim 1, wherein said stored information is read by said robot control section in response to a manual operation on said robot control section by an operator.

9. A robot system according to claim 1, wherein said stored information is automatically read by the robot control section when a power supply to said robot control section is turned on.

10. A robot system comprising:
  a robot mechanism section including a changeable mechanical unit;
  a robot control section for controlling respective axes of said robot mechanism section; and
  a memory provided at said mechanical unit and storing information concerning parameters inherent to individuality of said mechanical unit to be used in calculation for a locus control of the robot mechanism section by said robot control section, said memory being connected with said robot control section so that the stored information is read by said robot control section.

11. A robot system according to claim 10, wherein said stored information further includes information designating an algorithm to be used in calculation for the locus control by said robot control section.

12. A robot system according to claim 10, wherein said stored information includes data of a measured or estimated value of a length of a predetermined part of said mechanical unit.

13. A robot system according to claim 10, wherein said stored information includes data of an error between a measured or estimated value and a design value of a length of a predetermined part of said robot mechanical unit.

14. A robot system according to claim 10, wherein said mechanical unit has one or more motors for driving one or more axes, and one or more encoders for detecting rotation of the motors, said memory comprises a nonvolatile memory associated with one of said encoders, and said robot control section reads information stored in the nonvolatile memory using a communication line between said one of the encoders and said robot control section.

15. A robot system according to claim 10, wherein said memory stores identification information for identifying individuality of the mechanical unit, and said robot control section reads the identification information from said memory and if the read identification information is different from corresponding identification information stored in the robot control section, the read information including the identification information is substituted for the corresponding information stored in the robot control section.

16. A robot system according to claim 10, wherein said stored information is read by said robot control section in response to a manual operation on said robot control section by an operator.

17. A robot system, comprising:
  a changeable robot mechanism section having a wrist unit detachable from a main unit, the wrist unit having at least one memory storing information concerning parameters inherent to individuality of the wrist unit, the main unit having at least one memory storing information concerning parameters inherent to individuality of the main unit; and
  a robot control section for controlling the robot mechanism section connected to the robot mechanism section;
  wherein the robot control section reads the stored information from the main unit and the stored information from the wrist unit to calculate a locus control of the robot mechanism section.

18. A method for calculating a locus of a robot having a changeable robot mechanism section in communication with a robot control section, comprising:
  reading information concerning parameters inherent to individuality of the robot mechanism section stored in memories at the robot mechanism section;
  comparing the stored information with corresponding data stored in a memory of the robot control section to determine whether a kind of robot is changed and to determine whether at least one of the mechanical units of the robot mechanism section has changed;
  rewriting data indicating the kind of robot in the memory of the robot control section, if it is determined that the kind of robot has changed, and rewriting data indicating the changed mechanical unit, if it is determined that one of the mechanical units has changed; and
  computing the locus of the robot using the parameters inherent to individuality of the robot mechanism section.

* * * * *

UNITED STATES PATENT AND TRADEMARK OFFICE
CERTIFICATE OF CORRECTION

| | | |
|---|---|---|
| PATENT NO. | : 7,103,448 B2 | Page 1 of 1 |
| APPLICATION NO. | : 10/695664 | |
| DATED | : September 5, 2006 | |
| INVENTOR(S) | : Tetsuaki Kato et al. | |

It is certified that error appears in the above-identified patent and that said Letters Patent is hereby corrected as shown below:

Title Page Column 1 Item [75] (Inventors), Line 1, change "Hadano" to --Hadano-shi--.

Title Page Column 1 Item [75] (Assignee), Line 1, change "Inaternet, P." to --Internet, pp.--.

Column 1, Line 28, change "(i.e." to --(i.e.,--.

Column 1, Line 29, change "(i.e." to --(i.e.,--.

Column 3, Line 9, change "(i.e." to --(i.e.,--.

Column 3, Line 10, change "(i.e." to --(i.e.,--.

Column 3, Line 32, change "etc." to --etc.,--.

Column 3, Line 53, change "(i.e." to --(i.e.,--.

Column 5, Line 23, change "e.g." to --e.g.,--.

Column 5, Line 63, change "endoders" to --encoders--.

Column 9, Line 1, change "e.g." to --e.g.,--.

Signed and Sealed this

Twenty-second Day of May, 2007

JON W. DUDAS
*Director of the United States Patent and Trademark Office*